(12) United States Patent
McIntyre et al.

(10) Patent No.: US 7,063,104 B2
(45) Date of Patent: Jun. 20, 2006

(54) FLOW-THROUGH PRESSURE REGULATOR INCLUDING A CLOSURE MEMBER ASSEMBLY INTEGRATED WITH A HOUSING

(75) Inventors: Brian Clay McIntyre, Suffolk, VA (US); James Archie Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 168 days.

(21) Appl. No.: 10/455,630

(22) Filed: Jun. 6, 2003

(65) Prior Publication Data

US 2004/0055644 A1 Mar. 25, 2004

Related U.S. Application Data

(60) Provisional application No. 60/413,158, filed on Sep. 25, 2002.

(51) Int. Cl.
G05D 16/08 (2006.01)
F16K 1/42 (2006.01)

(52) U.S. Cl. .................. 137/315.05; 137/459; 137/510

(58) Field of Classification Search ................. 137/509, 137/510 I, 315.05; 123/459, 463, 465
See application file for complete search history.

(56) References Cited

U.S. PATENT DOCUMENTS

| 2,603,231 | A |   | 7/1952 | Birkemeier | 137/218 |
| 2,618,290 | A |   | 11/1952 | Van Vliet | 137/510 |
| 4,660,597 | A |   | 4/1987 | Cowles | 137/505.42 |
| 5,265,644 | A |   | 11/1993 | Tuckey | 137/510 |
| 5,435,344 | A | * | 7/1995 | Robinson et al. | 137/508 |
| 5,435,345 | A |   | 7/1995 | Robinson et al. | 137/508 |
| 5,509,444 | A | * | 4/1996 | Robinson et al. | 137/508 |
| 5,901,742 | A | * | 5/1999 | Kleppner et al. | 137/508 |
| 5,979,409 | A |   | 11/1999 | Robinson | 123/463 |
| 6,016,831 | A |   | 1/2000 | Bueser et al. | 137/315 |
| 6,039,030 | A |   | 3/2000 | Robinson et al. | 123/457 |

\* cited by examiner

Primary Examiner—Stephen M. Hepperle

(57) ABSTRACT

A flow-through pressure regulator includes a divider, a closure member and a housing. The divider separates a first chamber from a second chamber, and includes a passage that provides fluid communication between the first and second chambers. The closure member moves relative to the divider between first and second configurations. The first configuration substantially prevents fluid communication through the passage, and the second configuration permits fluid communication through the passage. The housing includes a first homogeneous housing portion and a second housing portion. The first homogeneous housing portion includes an inlet, defines the first chamber, and forms a pocket that receives a majority of the closure member. The second housing portion includes an outlet and defines the second chamber.

11 Claims, 4 Drawing Sheets

STAKING OPERATION

FLOW-THROUGH PRESSURE REGULATOR INCLUDING A CLOSURE MEMBER ASSEMBLY INTEGRATED WITH A HOUSING

This application claims the benefit of the earlier filing date of U.S. Provisional Application No. 60/413,158, filed on 25 Sep. 2002, the disclosure of which is incorporated by reference herein in its entirety.

FIELD OF THE INVENTION

A fuel pressure regulator relieves over-pressure in a fuel supply line between a fuel tank and an internal combustion engine. In particular, the fuel pressure regulator is responsible for supplying fuel, at or below a selected pressure, to a fuel injector of the internal combustion engine.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

A known flow-through pressure regulator includes a separate closure member assembly that is staked to a housing. An example of such a known flow-through pressure regulator is shown in FIG. 4. In particular, a separate closure member assembly 10 is staked to a housing 20. The closure member assembly 10 includes a machined ball pocket 12, a spring 14, a ball 16, and a ball retainer 18.

It is believed that the known flow-through pressure regulator suffers from a number of disadvantages including a manufacturing process that requires additional assembly operations as well as tooling to perform the staking. For example, in the known flow-through pressure regulator, the ball pocket is machined during a separate manufacturing step.

Thus, it is believed that there is a need to provide a flow-through pressure regulator that overcomes the disadvantages of the known flow-through pressure regulators.

SUMMARY OF THE INVENTION

The present invention provides a flow-through pressure regulator including a divider, a closure member and a housing. The divider separates a first chamber from a second chamber, and includes a passage that provides fluid communication between the first and second chambers. The closure member moves relative to the divider between first and second configurations. The first configuration substantially prevents fluid communication through the passage, and the second configuration permits fluid communication through the passage. The housing includes a first homogeneous housing portion and a second housing portion. The first homogeneous housing portion includes an inlet, defines the first chamber, and forms a pocket that receives a majority of the closure member. The second housing portion includes an outlet and defines the second chamber.

The present invention also provides a housing for a flow-through regulator. The housing includes first and second housing portions. The first housing portion is made from a single homogeneous member, and includes a set of apertures, first cylindrical, second cylindrical and conical portions, and a first annular flange. The set of apertures define a fluid flow inlet. The first and second cylindrical portions commonly extend along a longitudinal axis. The conical portion connects the first and second cylindrical portions. And the first annular flange lies in a plane that extends orthogonally with respect to the longitudinal axis. The second housing portion includes a fluid flow outlet and a second annular flange that matingly couples to the first annular flange.

The present invention also provides a method of manufacturing a flow-through pressure regulator. The flow-through pressure regulator includes a closure member that cooperates with a divider to prevent a flow of fluid through the flow-through pressure regulator in a first configuration and to permit the flow of fluid through the flow-through pressure regulator in a second configuration. The method includes forming a first housing part from a single homogeneous member, forming a second housing part that defines a fluid flow outlet, and coupling the first and second housing parts. The coupling sandwiches the divider between the first and second housing parts.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
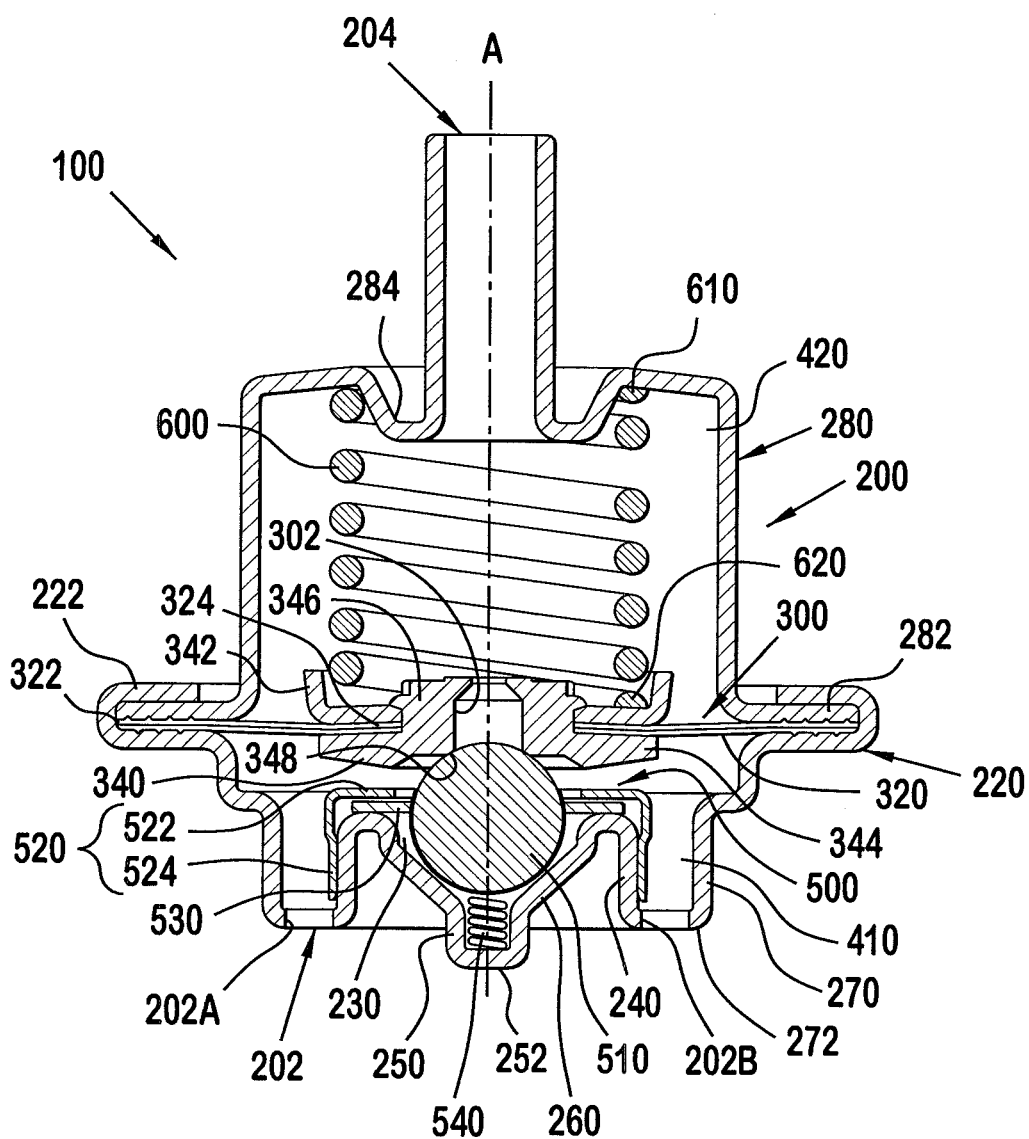
FIG. 1 is a cross-section view of a flow-through pressure regulator according to a preferred embodiment that includes a closure member assembly that is integrated with a housing.

FIG. 1 shows a preferred embodiment of a flow-through pressure regulator 100, including a closure member assembly that is integrated with a housing, according to the present invention. The flow-through pressure regulator 100 includes a housing 200 defining an interior volume 400. The interior volume 400 of the housing 200 is separated by a divider 300 into a first chamber 410 and a second chamber 420. The divider 300 includes a passage 302 that provides fluid communication between the first and second chambers 410, 420. A closure member 500 prevents or permits flow-through the passage 302.

The housing 200 has an inlet 202 and an outlet 204 spaced along a longitudinal axis A. The housing 200 can include a first housing portion 220 and a second housing portion 280 that are secured together to form the housing 200 that defines the interior volume 400. Preferably, the manner of securing includes crimping an annular flange 222 of the first housing portion 220 with an annular flange 282 of the second housing portion 280. Of course, other fastening techniques such as welding, soldering, adhering, etc. may also be used to fasten the first and second housing portions 220, 280.

The first housing portion 220 is shaped, preferably out of metal, in a single manufacturing operation, e.g., stamping. Of course, other materials and techniques may be used, including molding with a plastic material, provided that the first housing portion 220 is formed as a homogeneous member. As it is used herein, the term "homogeneous" refers to a member that is formed completely from a single piece of material and therefore has material characteristics that are generally consistent throughout the entire member. As such, a homogeneous member according to the present invention eliminates a separate valve assembly by incorporating a ball pocket into the housing, and eliminates the staking operations that were necessary in known flow-through pressure regulators to attach a separate closure member assembly to the housing.

The inlet 202 of the housing 200 is preferably located in the first housing portion 220, and the outlet 204 of the housing 200 is preferably located in the second housing portion 280. The inlet 202 can be a plurality of apertures (two apertures 202A,202B are shown) penetrating the first housing portion 220. The outlet 204 can be a port penetrating the second housing portion 280.

The divider 300, which can include a diaphragm 320 and a seat 340, is suspended in the housing 200. Preferably, an outer perimeter 322 of the diaphragm 320 is sandwiched between the annular flanges 222,282 such that the divider 300 separates the interior volume 400 into the first and second chambers 410,420. Preferably, the flange 222 is rolled over the circumferential edge of the flange 282 and then preferably crimped, as discussed above, so as to form the housing 200 and at the same time secure the diaphragm 320 with respect to the housing 200.

A resilient calibrating element 600 biases the divider 300 against the closure member 500 at a predetermined force, which relates to the desired pressure at which the regulator 100 is to operate. The resilient calibrating element 600, which is preferably a coil spring, may be located in the second chamber 420 by a locator 284 on the second housing portion 280. The locator 284 may include a dimpled center portion that also provides the outlet 204. The locator 284 positions a first end 610 of the resilient calibrating element 600, while a second end 620 of the resilient calibrating element 600 is positioned with respect to the seat 340 by a seat retainer 342. According to a preferred embodiment, the seat retainer 342 is secured to the seat 340 such that an inner perimeter 324 of the diaphragm 320 is sandwiched between the seat 340 and the seat retainer 342.

The seat 340 is suspended in the housing 200 by the diaphragm 320 and provides the passage 302. Preferably, the passage 302 extends along the longitudinal axis A between a first seat portion 344 and a second seat portion 346. The first seat portion 344 is disposed in the first chamber 410 and the second seat portion 346 is disposed in the second chamber 420. The first seat portion 342 provides a seating surface 348 that cooperates with the closure member 500. In the manufacturing of the seat 340, the seating surface 348 is finished to assure a smooth sealing surface for the closure member 500.

Preferably, the closure member 500 includes a sphere 510 that is retained in the pocket 230 by a closure member retainer 520 and a washer 530. The closure member retainer 520 includes a generally flat, annular part 522 and a cylindrical part 524. The annular part 522 engages the washer 530 and the cylindrical part 524 engages the housing 220. The washer 530 has an inside diameter that is somewhat smaller than the diameter of the sphere ball 510 such that the sphere ball 510 cannot pass through the washer 530. In turn, the annular part 522 has an inside diameter that is less than an outside diameter of the washer 530 such that the washer 530 cannot pass through the annular part 522 of the closure member retainer 520.

A resilient positioning element 540 biases the sphere 510 into engagement with the inside diameter of the washer 530. Preferably, the resilient positioning element 540 is a coil spring, and the inside diameter of the washer 530 includes a surface finish that provides smooth sliding contact with the sphere 510.

The first housing portion 220 defines a pocket 230 in which the resilient positioning element 540 and a majority of the sphere 510 are received. The first housing portion 220 includes a first cylindrical portion 240, a second cylindrical portion 250, and a conical portion 260. The first cylindrical portion 240 and cylindrical part 524 of the closure member retainer 520 cooperatively engage one another. Preferably, the cylindrical part 524 is press fit onto the first cylindrical portion 240 so as to capture the outside diameter of the washer 530 between the annular part 524 and the first housing portion 220. The second cylindrical portion 250 and an endwall 252 of the first housing portion 220 define a compartment in which the resilient positioning element 540 is received. The conical portion 260 connects the first and second cylindrical portions 240,250 and can support the sphere 510, but does not interfere with the movement of the sphere 510.

The first housing portion 220 may also include a third cylindrical portion 270, which is preferably arranged concentrically with the first and second cylindrical portions 240,250 and arranged so as to extend along the longitudinal axis A. Preferably, an annular portion 272 of the first housing portion 220 connects the first and third cylindrical portions 240,270, and the annular portion 272 is penetrated by the plurality of apertures 202A,202B. The third cylindrical portion 270 may be press fitted into a mating socket (not shown) of a system for regulating fuel pressure.

Preferably, the first housing portion 220 is formed out of metal in a single stamping operation, and the closure member retainer 520 is stamped out of metal and is press-fit onto the second cylindrical portion 250 of the first housing portion 220. Of course, other materials and techniques may be used, including molding out of a plastic material.

Figure 2:
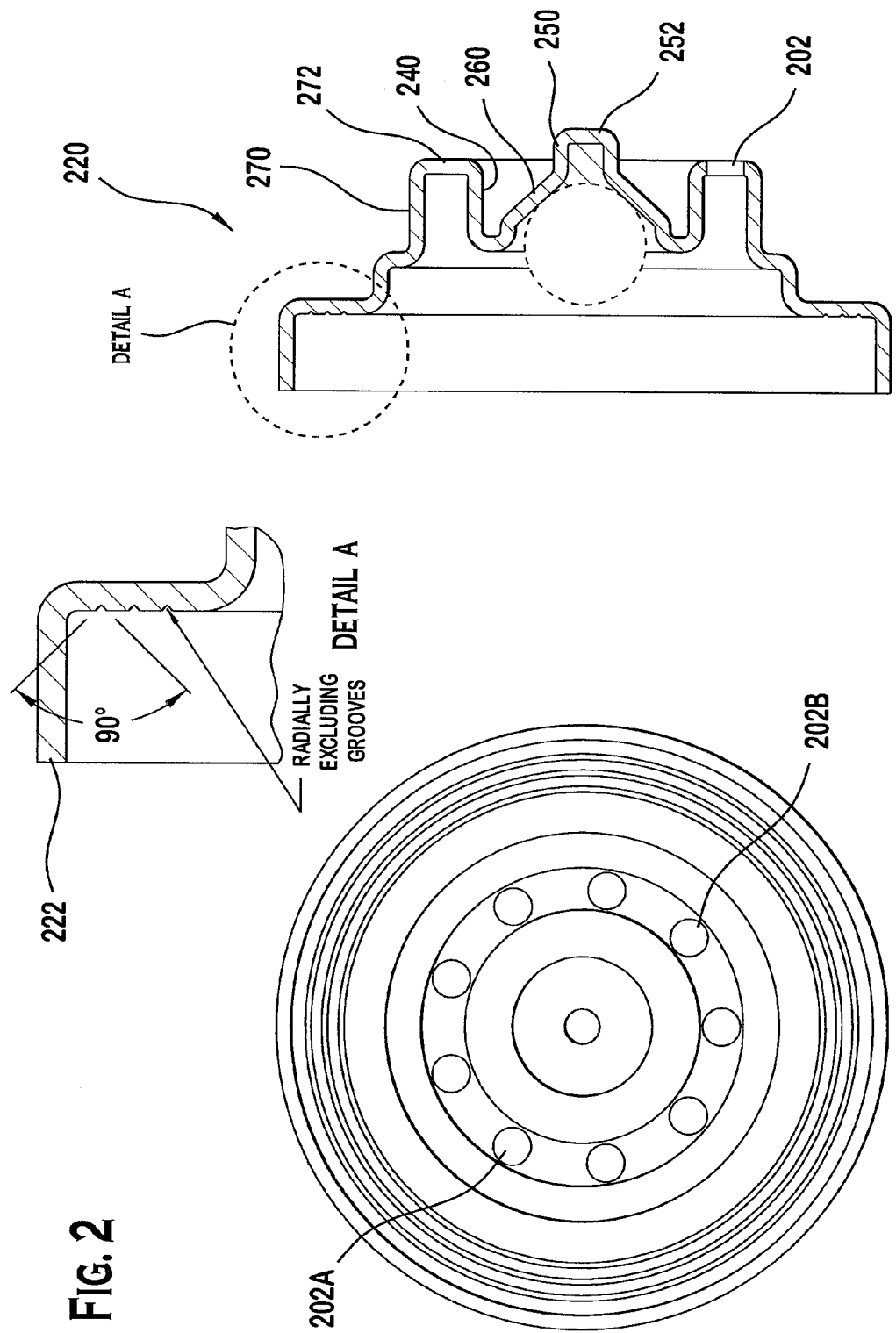
FIG. 2 is a group of detail views of a housing portion for the flow-through pressure regulator shown in FIG. 1.
Figure 3:
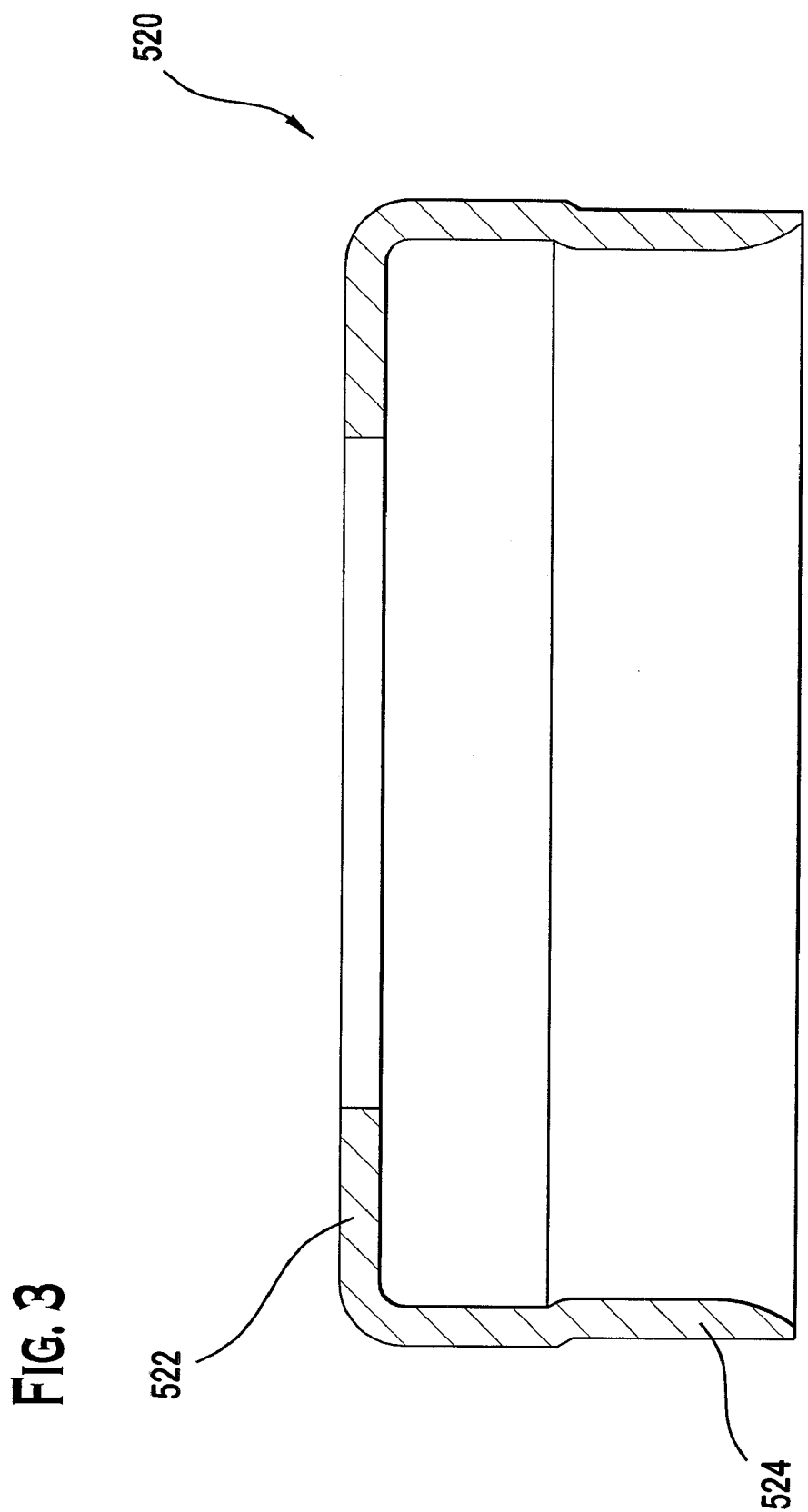
FIG. 3 is a cross-section view of a closure member retainer for the flow-through pressure regulator shown in FIG. 1.
Figure 4:
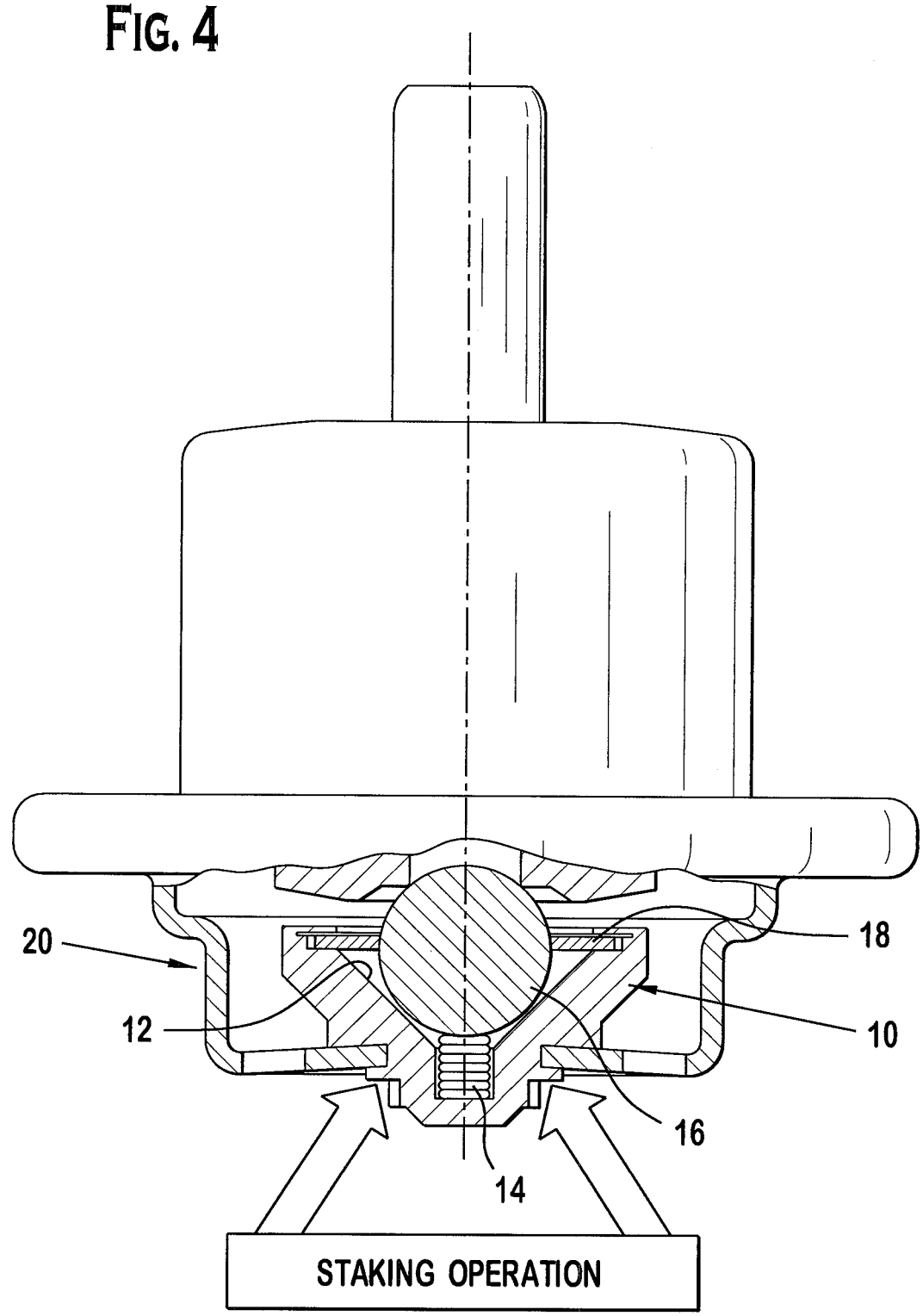
FIG. 4 is a partial cross-section view of a known flow-through pressure regulator that includes a separate closure member assembly that is staked to a housing assembly.

Referring additionally to FIGS. 2 and 3, there is shown one set of preferred dimensions for the first housing portion 220 and the closure member retainer 520, respectively.

One method of assembling the pressure regulator 100 is to form, e.g., stamp, the first and second housing portions 220,280, to assemble and install in the first and second chambers 410,420 the divider 300, the closure member 500, and the resilient calibrating element 600. According to the present invention, at least the first housing portion 220 is formed from a single homogeneous member, e.g., a metal sheet.

Preferably, the closure member 500 is installed in the first housing portion 220 by 1) installing the resilient positioning element 540 in the compartment defined by the second cylindrical portion 250 and the endwall 252; 2) installing the sphere 510 in the pocket 230; 3) installing the washer 530 over the sphere 510; and 4) press fitting the cylindrical part 524 of the closure member retainer 520 onto the second cylindrical portion 250 of the first housing portion 220 such that the washer 530 is captured between the annular portion 522 of the closure member retainer 520 and the first housing portion 220. Preferably, the washer 530 is captured loosely between the annular portion 522 and the first housing portion 220 such that it may float, e.g., is allowed a limited amount of longitudinal and radial motion with respect to the axis A. By virtue of being able to float, the washer 530 permits the sphere 510, under the bias of the resilient positioning element 540, to align with respect to the seating surface 348.

Preferably, the divider 300 is assembled by installing the inner perimeter 324 of the diaphragm 320 on the seat 340, so as to surround the passage 302, and press fitting the seat retainer 342 onto the seat 340 so as to sealingly sandwich therebetween the inner perimeter 324.

The resilient calibrating element 600 is installed in the second housing portion 280. Preferably, the first end 610 of the resilient calibrating element 600 is positioned with respect to the locator 284 of the second housing portion 280, and the second end 620 of the resilient calibrating element 600 is positioned with respect to the seat retainer 342.

The first and second housing portions 220,280 are then matingly engaged. Preferably, the flange 222 of the first housing portion 220 is abutted against the flange 282 of the second housing portion 280, and the flange 222 is crimped around the flange 282. Of course, the flange 282 may alternatively be crimped around the flange 222, or another coupling technique, e.g., welding or adhering, may be used to secure the first and second housing portions 220,280 with respect to one another.

The operation of the flow-through pressure regulator in a fuel system will now be described. The resilient calibrating element 600 acts through the seat retainer 342 to bias the divider 300 toward the closure member 500. The resilient positioning element 540 biases the sphere 510 against the seating surface 348 of the seat 340. In a first configuration, the sphere 510 is seated against surface 348 so as to prevent a flow of fuel through the pressure regulator 100.

Fuel enters the regulator 100 through apertures 202A, 202B and exerts pressure on the divider 300. When the force of the fuel pressure acting on the divider 300 is greater than the force exerted by the resilient calibrating element 600, the diaphragm 320 flexes so as to allow the seat 340 to move along the longitudinal axis A, and the sphere 510 separates from the seating surface 348 of the seat 340. This is a second configuration that permits the flow of fuel through inlet 202, into the first chamber 410, between the sphere 510 and the seat 340, through the passage 302 into the second chamber 420, and through the outlet 204. Selection of the resilient calibrating element 600, and more particularly the force exerted by the resilient calibrating element 600 on the divider 300, determines the fuel pressure level at which pressure regulation, i.e., the transition between the first and second configurations, occurs in the pressure regulator 100.

A closure member assembly that is integrated with the housing, according to the present invention, eliminates a separate closure member assembly, and eliminates the staking operations that were necessary in known flow-through pressure regulators to attach a separate valve assembly to the housing.

A closure member assembly that is integrated with the housing, according to the present invention, incorporates the pocket into the stamped housing. This overcomes a disadvantage of known flow-through pressure regulators wherein a ball pocket is machined during an additional manufacturing step.

A closure member assembly that is integrated with the housing, according to the present invention, allows the resilient positioning element, the sphere, and the washer to be captured by a closure member retainer that is press-fit onto the housing.

And closure member assembly that is integrated with the housing, according to the present invention, provides an easier and more cost-effective way of assembling a flow-through pressure regulator.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:
   a divider separating first and second chambers, the divider including a passage providing fluid communication between the first and second chambers;
   a closure member moving relative to the divider between first and second configurations, the first configuration substantially preventing fluid communication through the passage, and the second configuration permitting fluid communication through the passage;
   a housing including:
      a first homogeneous housing portion including an inlet and defining the first chamber, the first homogeneous housing portion forming a pocket receiving a majority of the closure member; and
      a second housing portion including an outlet and defining the second chamber; and
   a retainer maintaining the majority of the closure member within the pocket, wherein the retainer is located in the first chamber and secured to the first homogenous housing portion with a press fit.

2. The flow-through pressure regulator of claim 1, wherein the divider comprises a seat, the seat being suspended by the divider in the housing and defining the passage, the seat having first and second seat portions spaced along the longitudinal axis, the first seat portion being disposed in the first chamber, and the second seat portion being disposed in the second chamber.

3. The flow-through pressure regulator of claim 2, wherein the first configuration comprises the closure member engaging the first seat portion, and the second configuration comprises the closure member being spaced from the first seat portion.

4. The flow-through pressure regulator of claim 2, wherein the divider comprises a diaphragm suspending the seat with respect to the housing.

5. The flow-through pressure regulator of claim 4, wherein the diaphragm comprises a flexible annular member.

6. The flow-through pressure regulator of claim 4, wherein the diaphragm comprises a first perimeter sandwiched between the first and second housing portions.

7. The flow-through pressure regulator of claim 6, wherein the diaphragm comprises a second perimeter being secured to the seat, and the passage extending through the second perimeter.

8. The flow-through pressure regulator of claim 1, wherein the closure member comprises a sphere.

9. The flow-through pressure regulator of claim 1, wherein the passage extends along a longitudinal axis, and the closure member is movable along the longitudinal axis relative to the first homogeneous housing portion.

10. The flow-through pressure regulator of claim 9, comprising:
a resilient element biasing the closure member from the first homogeneous housing portion and toward the divider.

11. A flow-through pressure regulator, comprising:
a divider separating first and second chambers, the divider including a passage providing fluid communication between the first and second chambers;
a closure member moving relative to the divider between first and second configurations, the first configuration substantially preventing fluid communication through the passage, and the second configuration permitting fluid communication through the passage;
a housing including:
   a first homogeneous housing portion including an inlet and defining the first chamber, the first homogeneous housing portion forming a pocket receiving a majority of the closure member; and
   a second housing portion including an outlet and defining the second chamber;
a resilient element biasing the closure member from the first homogenous housing portion and toward the divider; and
a retainer maintaining the majority of the closure member within the pocket, wherein the pocket comprises a first cylindrical portion engaging the retainer, a second cylindrical portion supporting the resilient element, and a conical portion connecting the first and second cylindrical portions, the conical portion receiving the majority of the closure member.

* * * * *